US007260588B2

(12) United States Patent
Werner

(10) Patent No.: US 7,260,588 B2
(45) Date of Patent: Aug. 21, 2007

(54) LOCATION-BASED OPERATIONS FOR INFORMATION HANDLING SYSTEMS

(76) Inventor: Raymond J. Werner, 3235 NW. 123nd Pl., Portland, OR (US) 97229

( * ) Notice: Subject to any disclaimer, the term of this patent is extended or adjusted under 35 U.S.C. 154(b) by 492 days.

(21) Appl. No.: 09/939,167

(22) Filed: Aug. 24, 2001

(65) Prior Publication Data
US 2002/0198898 A1 Dec. 26, 2002

Related U.S. Application Data

(63) Continuation-in-part of application No. 09/888,822, filed on Jun. 22, 2001, now abandoned.

(51) Int. Cl.
*G06F 17/00* (2006.01)
*G06F 12/00* (2006.01)
(52) U.S. Cl. .......................... 707/200; 707/7
(58) Field of Classification Search .................... 707/3, 707/10, 104.1, 200, 7; 379/356.01, 220.01, 379/355, 357; 709/203, 206, 224; 701/209, 701/212, 213; 711/122, 144, 146
See application file for complete search history.

(56) References Cited
U.S. PATENT DOCUMENTS 5,592,546 A * 1/1997 Takahashi .............. 379/355.05
5,606,688 A * 2/1997 McNutt et al. ............. 711/170
6,208,935 B1 * 3/2001 Yamada et al. ............. 701/209
6,212,475 B1 * 4/2001 France et al. ............... 701/214
6,301,350 B1 * 10/2001 Henningson et al. .. 379/220.01
6,526,436 B1 * 2/2003 Shiraishi et al. ............ 709/206
6,687,878 B1 * 2/2004 Eintracht et al. ........... 715/512
6,731,746 B1 * 5/2004 Usami .................... 379/356.01
6,738,616 B1 * 5/2004 Link et al. .................. 455/417
6,779,127 B1 * 8/2004 Lee .............................. 714/4
2003/0069893 A1 * 4/2003 Kanai et al. ............. 707/104.1
2004/0228619 A1 * 11/2004 Kageyama et al. ........... 386/95

* cited by examiner

*Primary Examiner*—Jeffrey Gaffin
*Assistant Examiner*—Jacques Veillard
(74) *Attorney, Agent, or Firm*—Werner & Axenfeld, PC

(57) ABSTRACT

A location-aware product includes a location information resource for providing the present location of the location-aware product to within some margin of error, and such present location information is included by the location-aware product in various outputs, including but not limited to, location stamps in files for create, open, and/or modify file operations. In a further aspect, location information may be used in determining the time zone or zones in which one or more operations have occurred, and to provide the basis for updating clocks, or other resources, useful for time stamping of various operations and outputs. In a still further aspect of the present invention, information displays may be sorted by accounting for the differences in times and dates introduced through time stamping of events in different time zones.

5 Claims, 14 Drawing Sheets

Fig. 14

Example Default Directory Listing:

| Line | name | size | date | time | | Time Zone | Lat | Long |
|---|---|---|---|---|---|---|---|---|
| 1 | A file | 56K | 5/16/01 | 3:00 | PM | PDT | | |
| 402 — 2 | B file | 79K | 2/15/01 | 8:45 | AM | PST | N 45° 59.009' | N 122° 25.064' |
| 3 | C file | 35K | 8/1/01 | 10:00 | AM | EDT | N 45° 46.736' | N 84° 43.856' |
| 4 | D file | 60K | 6/28/01 | 11:00 | PM | PDT | N 45° 59.009' | N 122° 25.064' |
| 5 | E file | 40K | 6/29/01 | 12:30 | AM | CDT | | |
| 6 | F file | 45K | 6/29/01 | 1:30 | AM | CDT | | |

Fig. 15

Example Directory Listing Sorted Most Recent to least Recent

| Line | name | size | date | Time | | Time Zone | Lat | Long |
|---|---|---|---|---|---|---|---|---|
| 502 — 1 | C file | 35K | 8/1/01 | 10:00 | AM | EDT | N 45° 46.736' | N 84° 43.856' |
| 2 | F file | 45K | 6/29/01 | 1:30 | AM | CDT | | |
| 504 — 3 | D file | 60K | 6/28/01 | 11:00 | PM | PDT | N 45° 59.009' | N 122° 25.064' |
| 506 — 4 | E file | 40K | 6/29/01 | 12:30 | AM | CDT | | |
| 5 | A file | 56K | 5/16/01 | 3:00 | PM | PDT | | |
| 6 | B file | 79K | 2/15/01 | 8:45 | AM | PST | N 45° 59.009' | N 122° 25.064' |

Fig. 17

Example Default Directory Listing with Specified Regions: ~1702

| Line | Name | Size | date | time | | Time Zone | Lat | Long | Specified Regions |
|---|---|---|---|---|---|---|---|---|---|
| 1 | A file | 56K | 5/16/01 | 3:00 | PM | PDT | | | Sales Area 2 ~1706 |
| 2 | B file | 79K | 2/15/01 | 8:45 | AM | PST | N45°59.009' | W122°25.064' | Sales Area 1 ~1704 |
| 3 | C file | 35K | 8/1/01 | 10:00 | AM | EDT | N45°46.736' | W84°43.856' | Sales Area 2 |
| 4 | D file | 60K | 6/28/01 | 11:00 | PM | PDT | N45°59.009' | W122°25.064' | Sales Area 1 |
| 5 | E file | 40K | 6/29/01 | 12:30 | AM | CDT | | | Sales Area 2 |
| 6 | F file | 45K | 6/29/01 | 1:30 | AM | CDT | | | Sales Area 1 |

Fig. 18

Example Directory Listing Sorted by Specified Regions:

| Line | Name | Size | date | time | | Time Zone | Lat | Long | Specified Region |
|---|---|---|---|---|---|---|---|---|---|
| 1 | B file | 79K | 2/15/01 | 8:45 | AM | PST | N45°59.009' | W122°25.064' | Sales Area 1 ~1802 |
| 2 | D file | 60K | 6/28/01 | 11:00 | PM | PDT | | W122°25.064' | Sales Area 1 |
| 3 | F file | 45K | 6/29/01 | 1:30 | AM | CDT | | | Sales Area 1 |
| 4 | A file | 56K | 5/16/01 | 3:00 | PM | PDT | N45°59.009' | W122°25.064' | Sales Area 2 ~1804 |
| 5 | C file | 35K | 8/1/01 | 10:00 | AM | EDT | N45°46.736' | W84°43.856' | Sales Area 2 |
| 6 | E file | 40K | 6/29/01 | 12:30 | AM | CDT | | | Sales Area 2 |

LOCATION-BASED OPERATIONS FOR INFORMATION HANDLING SYSTEMS

RELATED APPLICATIONS

This is a continuation-in-part of application Ser. No. 09/888,822, filed Jun. 22, 2001 now abandoned.

BACKGROUND OF THE INVENTION

1. Field of the Invention

The methods and apparatus of the present invention relate generally to the field of location-based services, and more particularly to applications of location information for location-aware products.

2. Background

The deployment in modern times of communication satellites in earth orbit, such as those which form the well-known Global Positioning System (GPS), have enabled, first, military systems, and subsequently, commercial systems to use signals from orbiting satellites to determine their location on earth. In this way, the navigation of military and commercial vehicles by automatic guidance systems has been facilitated.

In addition to guidance system applications, signals from the Global Positioning System have been used in conjunction with various hardware and software products for providing terrestrial coordinates to users such as hikers or backpackers who want or need to know their locations. Similarly, fleets of trucks have been equipped with GPS systems so that their location can be monitored.

As the application and acceptance of GPS based location systems has grown the cost of such GPS hardware and software has begun to decline. With declining prices, it is anticipated that the deployment of such location information resources in a wide variety of electronic products will become feasible.

What is needed are practical uses for such location information resources in consumer products, such as, but not limited to mobile consumer electronics devices.

SUMMARY OF THE INVENTION

Briefly, a location-aware product includes a location information resource for providing the present location of the location-aware product to within some margin of error, and such present location information is included by the location-aware product in various outputs, including but not limited to, location stamps in files for create, open, and/or modify file operations. In a further aspect, location information may be used in determining the time zone or zones in which one or more operations have occurred, and to provide the basis for updating clocks, or other resources, useful for time stamping of various operations and outputs. In a still further aspect of the present invention, information displays may be sorted by accounting for the differences in times and dates introduced through time stamping of events in different time zones.

BRIEF DESCRIPTION OF THE DRAWINGS

FIG. 14 provides an example display of default sort order.

FIG. 15 provides an example display of directory listing sorted by time zone information.

FIG. 17 provides an example display of directory listing with specified regions information added.

FIG. 18 provides an example display of directory listing sorted by user defined specified regions.

DETAILED DESCRIPTION

Generally, various embodiments of the present invention may obtain location information from a location information resource, such as but not limited to, a GPS receiver and processing circuitry, incorporate that location information into one or more files, such as, but not limited, to text files, email files, word processing files, and so on; or 2) subsequently provide such stored location information to a display, such as, but not limited to, a directory listing of files that includes the location of creation or modification of the file, in addition to, or in place of, other file parameters such as, for example, file size, file type, or time of creation or modification of the file.

Reference herein to "one embodiment", "an embodiment", or similar formulations, means that a particular feature, structure, or characteristic described in connection with the embodiment, is included in at least one embodiment of the present invention. Thus, the appearances of such phrases or formulations herein are not necessarily all referring to the same embodiment. Furthermore, various particular features, structures, or characteristics may be combined in any suitable manner in one or more embodiments.

Figure 1:
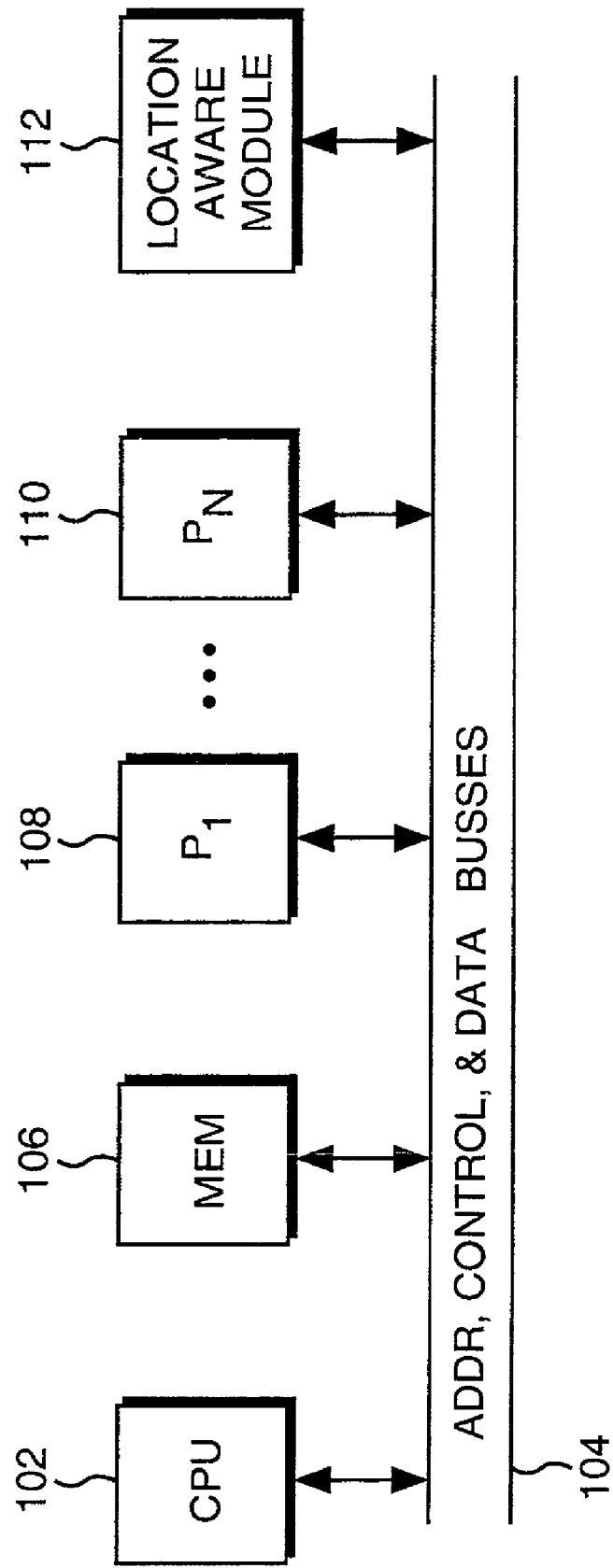
FIG. 1 is a block diagram representation of a computer equipped with an exemplary module that provides location information to the computer in accordance with the present invention.

FIG. 1 is a block diagram representation of a computer equipped with an exemplary module that provides location information to the computer in accordance with the present invention. More particularly, a central processing unit (CPU) 102 is shown coupled to a bus 104. Similarly, a memory 106, peripherals 108, 110, and a location-aware module 112 are included in the computer and are also coupled to bus 104. It should be noted that various other computer or digital system architectures may be used in accordance with the present invention. For example, some computer systems use a different bus to couple system memory to the CPU, than is used to couple peripheral devices to the CPU, and such systems may be used in embodiments of the present invention. In the illustrated embodiment, location-aware module 112 includes a GPS receiver and processing circuitry to convert the received GPS signals into location coordinates, such as, but not limited to, latitude and longitude. An antenna suitable for receiving GPS signals is typically included within location-aware module 112, but such antenna may be spaced apart from location-aware module 112. If the antenna is spaced apart from location-aware module 112, then the antenna is appropriately coupled to module 112. Although FIG. 1 represents a computer equipped with a location resource, it will be understood, that this functionality may be included in a wide variety of electronic products, including consumer products, that include some computational capability, such as, but not limited to, cellular phones, personal digital assistants (PDA), electronic games, and so on. It will be further understood, that the utility of the present invention is greatest in mobile devices (e.g., laptop computer cellular phones, personal digital assistants (PDA), and electronic games) but the invention is not limited to devices that are typically mobile.

Figure 2:
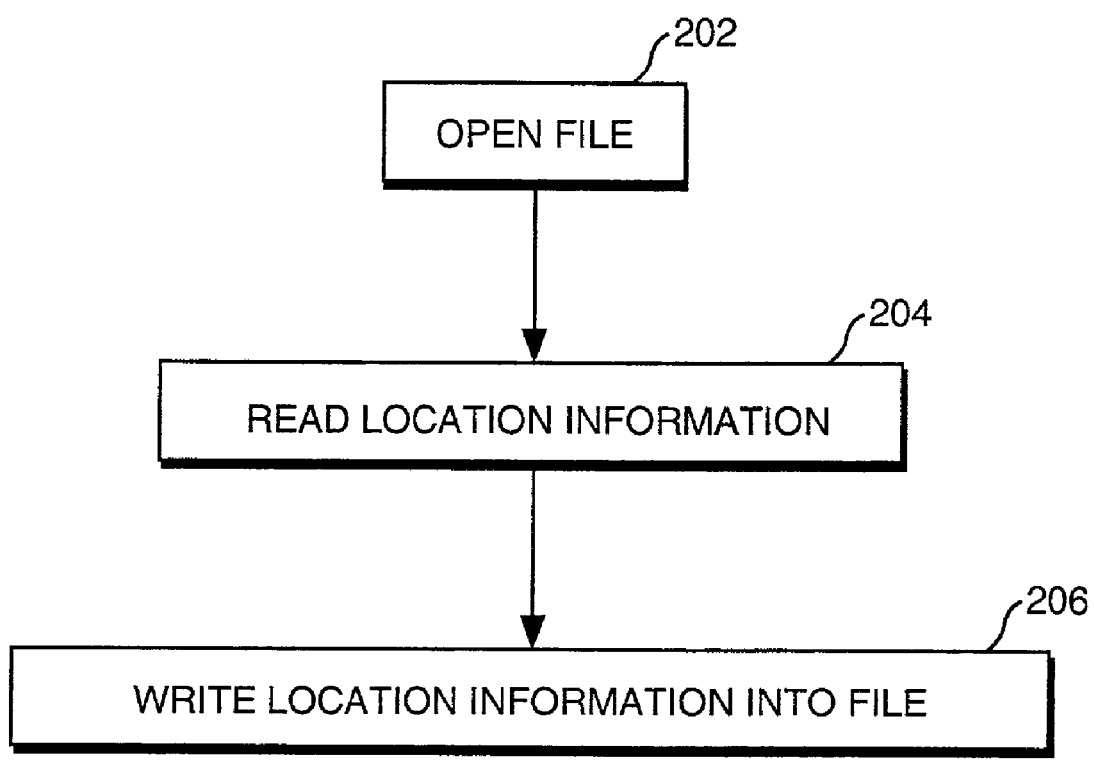
FIG. 2 is a flowchart of an illustrative process in accordance with the present invention that incorporates location information into a file in connection with a file open operation.

FIG. 2 is a flowchart of an illustrative process in accordance with the present invention that includes (i.e., inserts or incorporates) location information into a file in connection with a file open operation. More particularly, in this embodiment, a file is opened 202. File open operations are common in computer systems and are well understood. Such a file open operation is commonly initiated by a computer user by, for example, double-clicking on an iconic representation of the file in a graphical user interface. It is known that there are other means of opening files, including the opening of files by an operating system without the need for specific user action. Files opened in this way include, but are not limited to, text files, word processing files, spreadsheet files, database files, sound files, graphics files, video files, and so on. Subsequent to, or concurrent with, the opening of the file, location information is read 204 from a location information resource, such as the location-aware module 112 of FIG. 1. It is within the scope of the present invention to read the location information prior to the file opening, however, this may result in location information that is not contemporary with the actual location of the computer at the time that the file is open. Subsequent to reading the location information, at least a portion of the location information is written into the file 206. All the information obtained from the location resource may be written to the file, but depending on the particular implementation, the location resource may provide other information that does not need to be included in the file, such as information on altitude, time of day, speed, and so on. It is a designer's choice as to how much location and location-related data obtained from the location resource to include in the file. In a presently preferred embodiment, latitude and longitude information are stored in the file. In this way, a translation from latitude/longitude information, to geographical place name can be performed when the file is read. In this way, another aspect of the present invention is supported. That is, providing the geographical place name in the language of the present location. In other words, if a file on a laptop computer is opened in the United States, and the latitude/longitude information are included in the file, then on subsequent accesses of the file, it may be determined where that file open operation took place, and that location displayed in English if the laptop is still in the United States, but however, it may be displayed in French if the current location of the laptop is somewhere in France. Of course, other implementations of the present invention may elect to perform a latitude/longitude to geographical place name translation at the time of originally reading the latitude/longitude information, and incorporating the text of the geographical place name into the file. The location information is read from the location information resource is indicative of the physical location of the computer. The location information may be in any suitable format, and such formats include, but are not limited to, latitude/longitude, and geographical location name. It will be understood that although a computer is used in this example, other the present invention applies to other electronic devices, such as for example mobile consumer electronic devices, as well.

It should be noted that reading location information from location-aware module 112 is similar to reading information from any commonly available type of computer peripheral device. For example, one or more fixed addresses in a memory, or I/O space, of a computer may be read and the resulting data represents the location information. In an alternative embodiment, a command is written to location-aware module 112 and as a consequence, location information is transferred by location-aware module 112 to some pre-determined address. Those skilled in the art will appreciate that communication between a CPU and peripheral device in a computer system is a well-understood matter.

Figure 3:
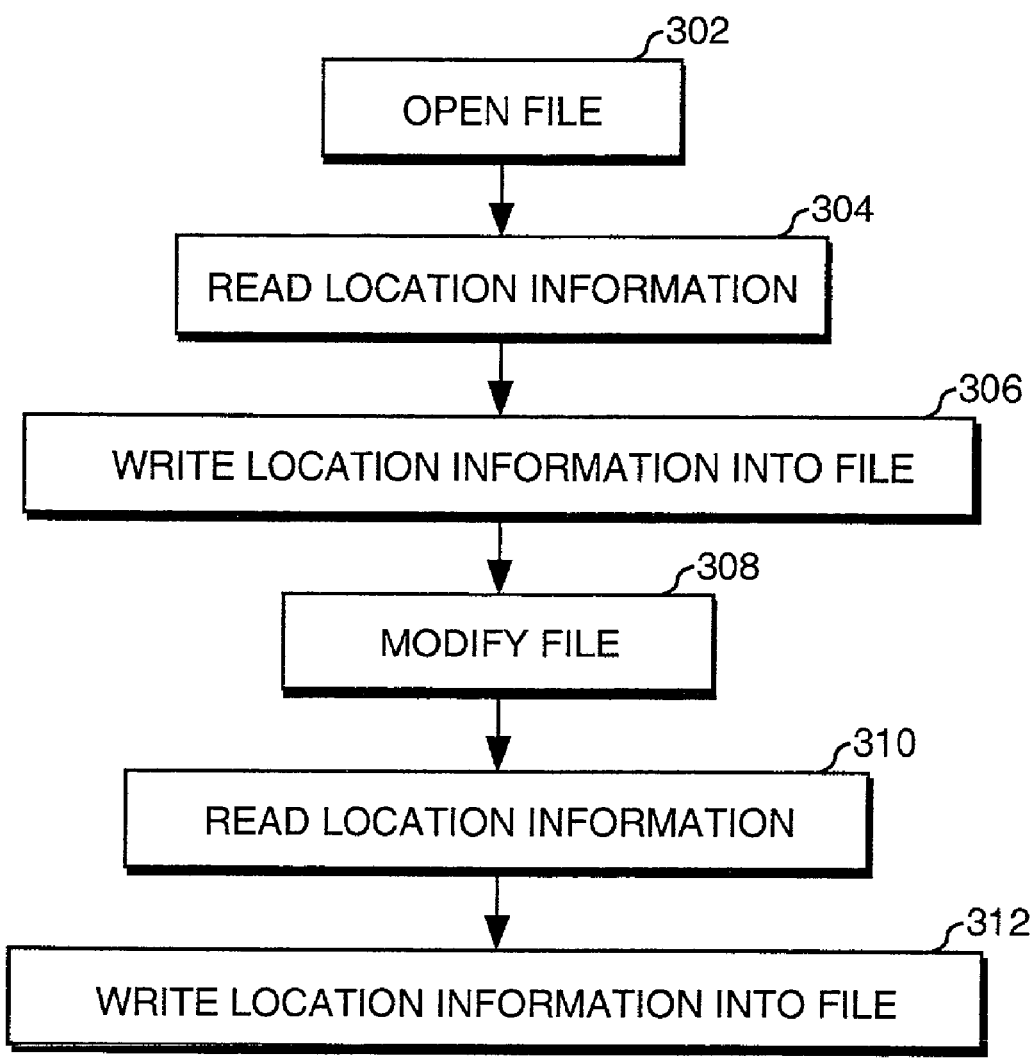
FIG. 3 is a flowchart of an illustrative process in accordance with the present invention that incorporates location information into a file in connection with a both a file open and a file modify operation.

FIG. 3 is a flowchart of an illustrative process in accordance with the present invention that includes (i.e., inserts or incorporates) location information into a file in connection with a both a file open (as shown in FIG. 2) and a file modify operation. More particularly, in this embodiment, a file is opened 302. Subsequent to, or concurrent with, the opening of the file, location information is read 304 from a location information resource, such as location-aware module 112 of FIG. 1. Subsequent to reading the location information, at least a portion of the location information is written 306 into the file. The location information read from the location information resource is indicative of the physical location of the computer. The location information may be in any suitable format, and such formats include, but are not limited to, latitude/longitude, and geographical location name. In this embodiment of the present invention, the file that was opened at 302 is now modified 308. Subsequent to, or concurrent with, the modification of the file, location information is read 310 from the location information resource. Subsequent to reading the location information, at least a portion of the location information is written 312 into the file. In this example, the incorporated location information is appropriately labelled as being associated with the file open operation or with the file modify operation. The computer system may include a history of location information associated with each open or modify operation, or only the most recent open or modify operation, or a combination. These implementation specific options can be chosen by the system designer, or can be made a user definable option in the computer system, similar to the user selecting a preferred screensaver, or desktop color.

Figure 4:
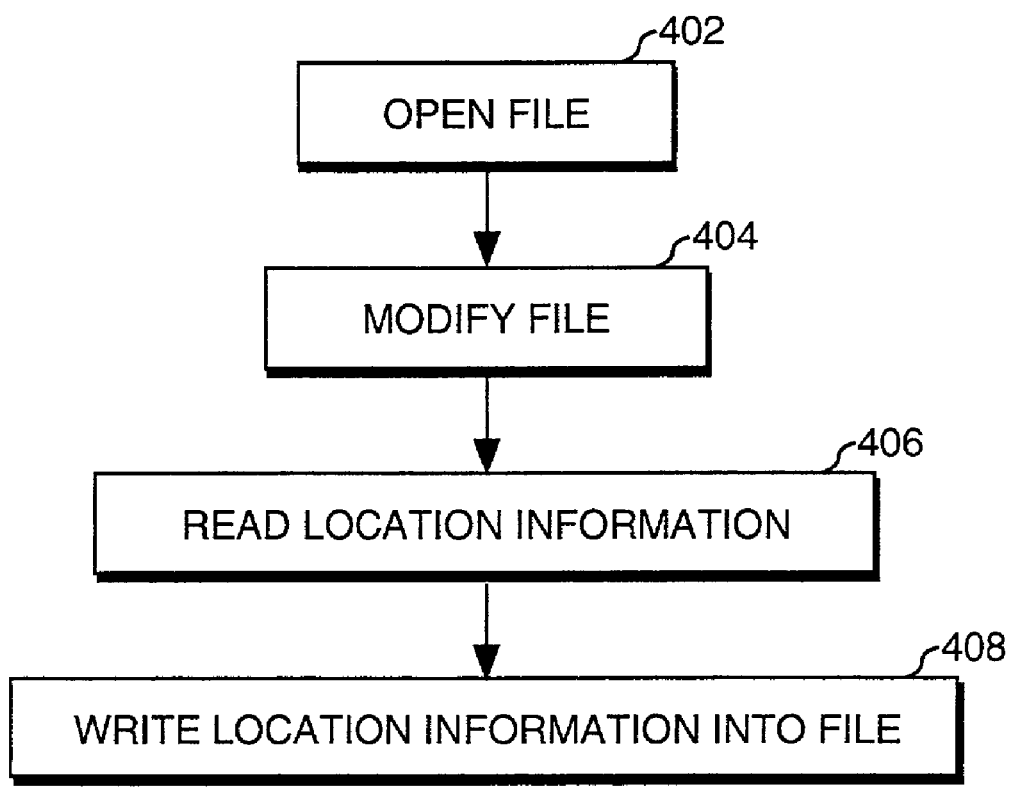
FIG. 4 is a flowchart of an illustrative process in accordance with the present invention that incorporates location information into a file in connection with a file modify operation.

FIG. 4 is a flowchart of an illustrative process in accordance with the present invention that includes (i.e., inserts or incorporates) location information into a file in connection with a file modify operation. More particularly, in this embodiment, a file is opened 402. Subsequent to the opening of the file, the file is modified 404. Location information is read 406 from a location information resource, such as location-aware module 112 of FIG. 1. Subsequent to reading the location information, at least a portion of the location information is written 408 into the file. The location information read from the location information resource is indicative of the physical location of the computer. The location information may be in any suitable format, and such formats include, but are not limited to, latitude/longitude, and geographical location name. This example is similar to that described in connection with FIG. 3, but does not include incorporating location information in connection with file open operations.

FIGS. 2 through 4 provide illustrative embodiments of the present invention. In a further aspect of the present invention, various embodiments including reading back the location information that was written into the files and displaying or otherwise utilizing that information. Location information that was stored, either in an opened or modified file, or some other file (e.g., a system file maintained by the computer's operating system) that is associated with the opened or modified file, can be read back and displayed alone or with other file attributes such as, for example, the date and time of the file open or modify operation. When a directory listing is obtained that includes location information, the directory listing may be sorted according to location, whether by latitude, longitude, alphabetically in accordance with geographical place name, or by regions (e.g., North America, Western Europe, Asia, and so on).

The operations writing and reading back location information from files, as described above, are typically implemented in software. Such software may be included in a computer's operating system, or may be installed on a computer as an application program.

Figure 5:
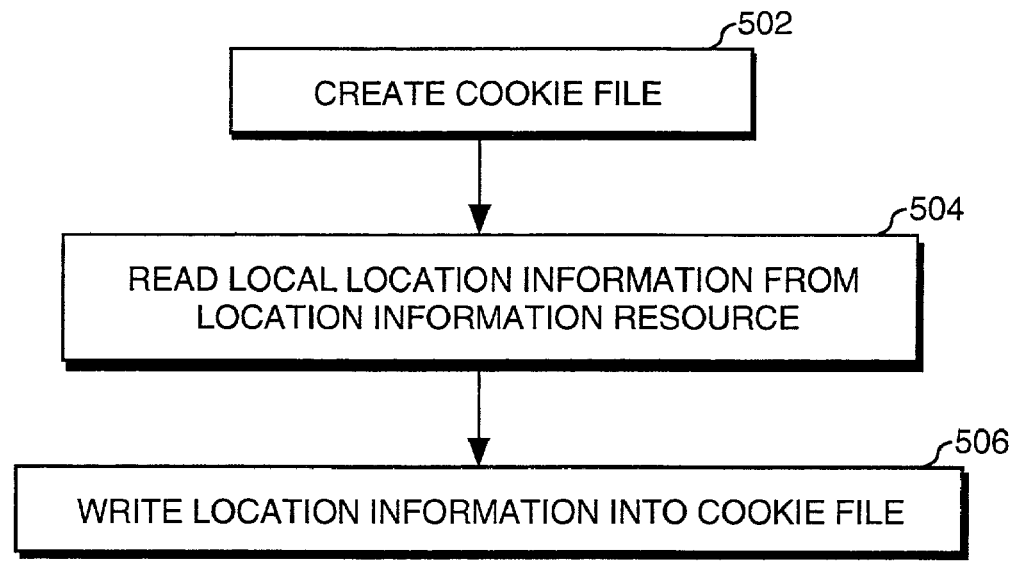
FIG. 5 is a flowchart of an illustrative process in accordance with the present invention that incorporates location information in a cookie file.

FIG. 5 is a flowchart of an illustrative process in accordance with the present invention that incorporates location information in a cookie file. Cookies or cookie files are terms that describe files stored on a client computer because of an interaction between, for example, a web browser software program running on the client computer, and a software program than runs on a web server computer. Typically such an interaction occurs when a computer user visits, or accesses a web site. Cookies are generally relatively small files that allow the software running on the web server to determine whether and when the client computer has accessed the web site. In one embodiment of the present invention, a cookie file is created on a client computer 502. Location information is obtained 504 from a location information resource present (such as, for example, location information resource 112 of FIG. 1) in the client computer. This location information is indicative of the location of the client computer at the time of the interaction with the web site. The location information may be in any suitable format, and such formats include, but are not limited to, latitude/longitude, and geographical location name. The location information is then written 506 into the cookie file. Such information in the cookie file can be useful to a web site operator in determining geographical usage patterns of the web site, i.e., from where the site is being accessed. Furthermore, the location information may be updated upon subsequent accesses of the cookie file. Similarly, a history, or log, of location information may be formed in the cookie file by additional accesses of the cookie file during, or as a consequence of, one or more interactions with the web site.

Figure 6:
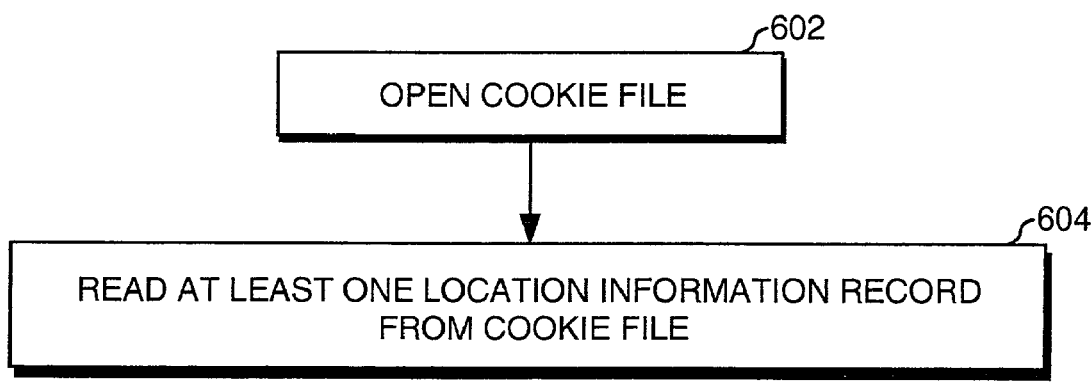
FIG. 6 is a flowchart of an illustrative process in accordance with the present invention that reads location information from a cookie file.

FIG. 6 is a flowchart of an illustrative process in accordance with the present invention that reads location information from a cookie file. More particularly, a cookie file that includes location information relative to where the client computer was located at the time the cookie file was created, last opened, or last modified, is opened 602. The cookie file may be opened in connection with a visit to a web site, or such similar interaction with a web server, or other computer system or process. Subsequently, at least one item of location information is read 604 from the cookie file. The location information may constitute a record in the file, although no particular file format is required by the present invention. The location information read from the cookie file may be transmitted back to the web server, mentioned above, so that geographical usage patterns may be determined. Methods and apparatus for communication between a web browser (client) and a web site (server) are well known and are not described further herein.

Figure 7:
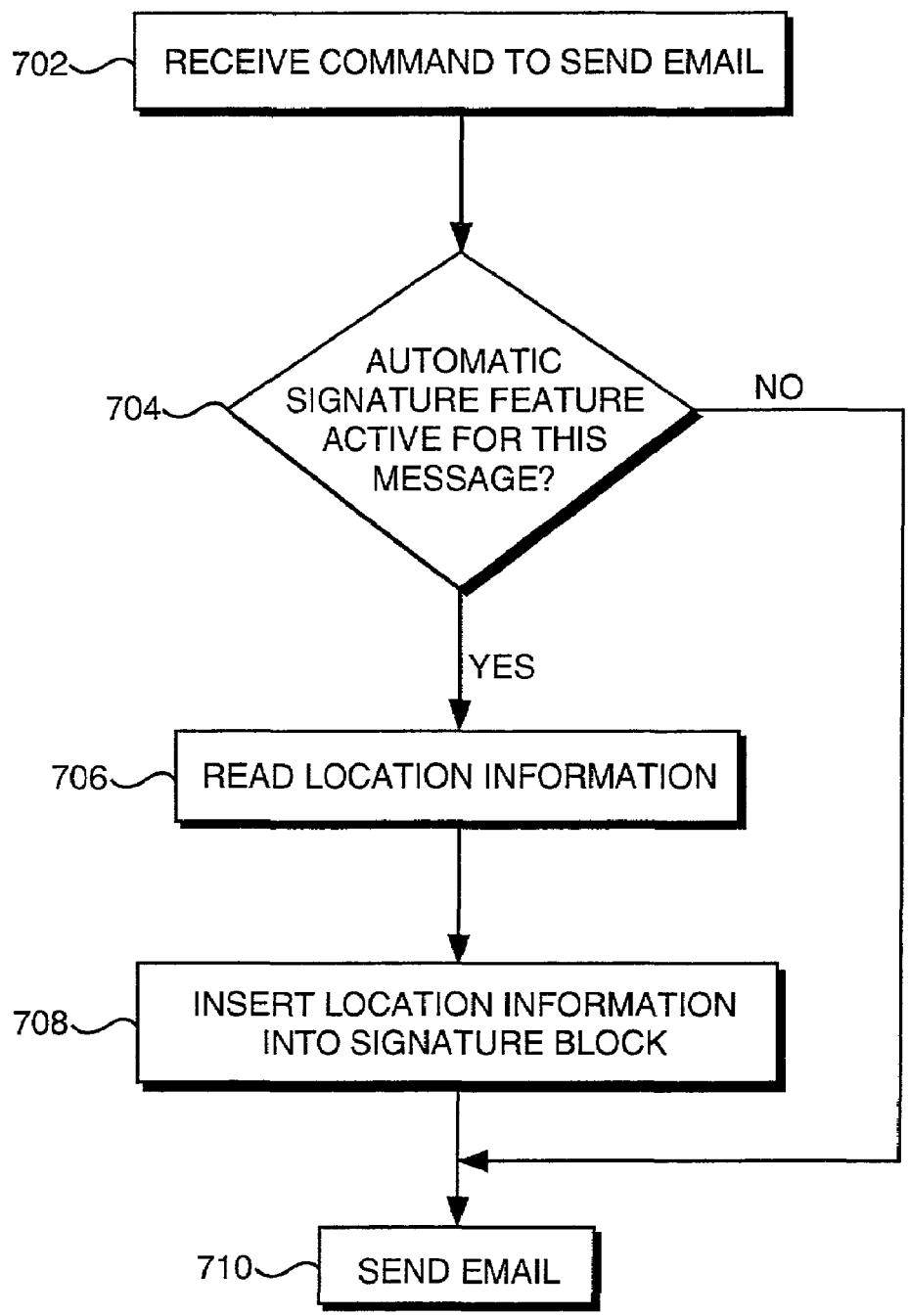
FIG. 7 is a flowchart of an illustrative process in accordance with the present invention that incorporates location information in a signature block of an email message.

FIG. 7 is a flowchart of an illustrative process in accordance with the present invention that incorporates location information into a signature block of an email message. Some of the well-known and widely available email programs provide users with a feature that automatically appends a signature block to their email. These signature blocks are typically defined by the email users and often include information such as, but not limited to, the name of the user, the user's phone number and address, business title, mail-stop, and so on. In this example, a computer system, or other information handling device, having a location information resource (such as location information resource 112 of FIG. 1), and capable of preparing and sending email, receives a command to send an email 702. A decision is then made 704 as to whether such an automatic signature feature is active for this message. If the automatic signature feature is not active, then the email is sent 710. If the automatic signature feature is active, then the current location of the computer, or other information handling device is obtained from the location information resource 706. That location information is appended to, or inserted into, the email message, for example into the signature block 708. The email is then sent 710. It is to be understood, that in this context sending an email may mean actually transmitting the email to another computer or information handling device, directly or through some communication network, or simply spooling the email for subsequent transmission.

Figure 8:
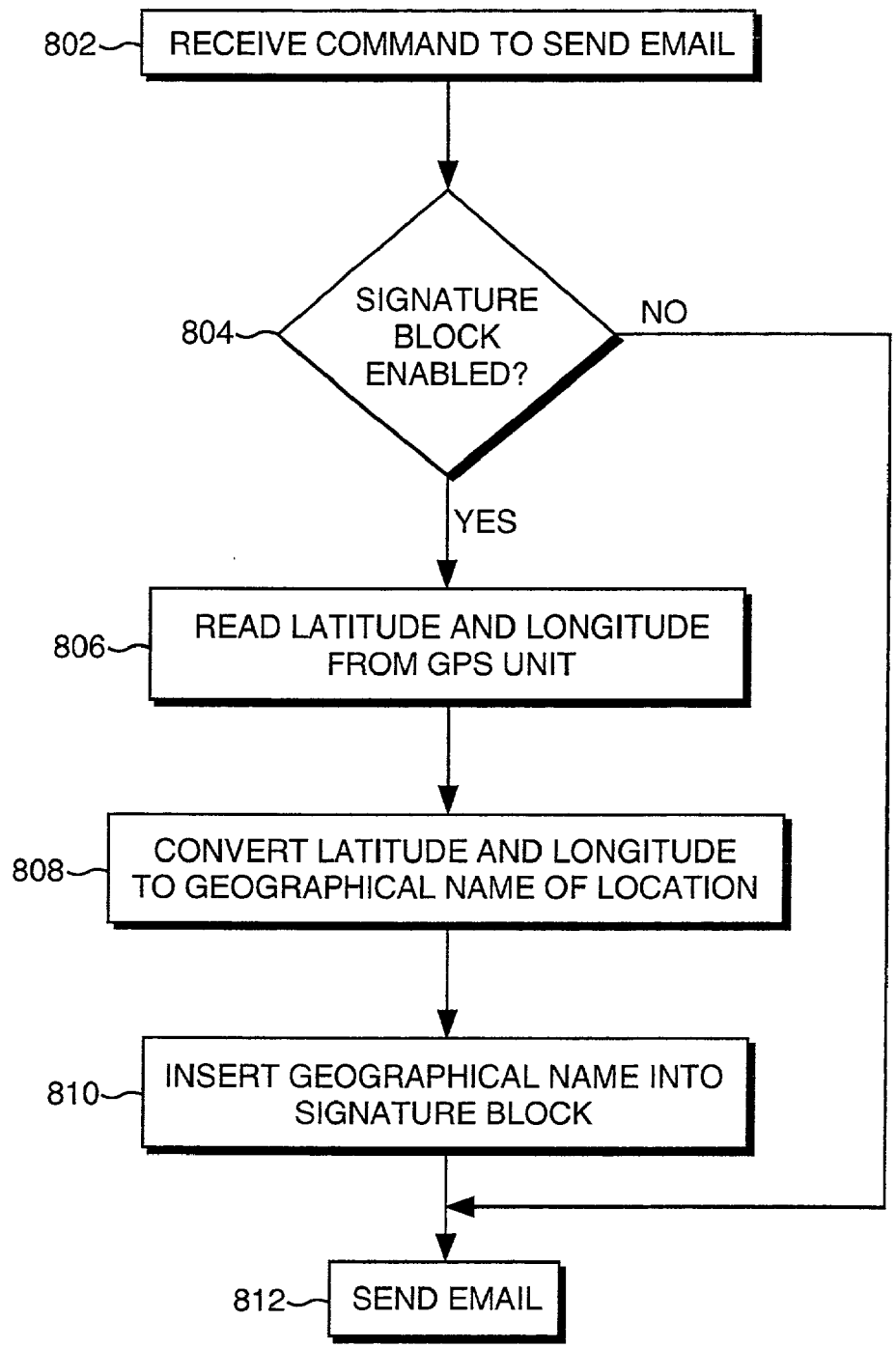
FIG. 8 is a flowchart of an illustrative process in accordance with the present invention that includes converting latitude and longitude information into geographical name information and inserting that geographical name information into a signature block of an email message.

FIG. 8 is a flowchart of an illustrative process in accordance with the present invention that includes converting latitude and longitude information into geographical name information and inserting that geographical name information into a signature block of an email message. This example is similar to the general example of FIG. 7, but illustrates a more specific example. More particularly, a computer system or other information handling device, having a location information resource (such as location information resource 112 of FIG. 1), and capable of preparing and sending email, receives a command to send an email 802. A decision is then made 804 as to whether a signature block feature is active for this message. If the signature block feature is not active, then the email is sent 812. If the signature block feature is active, then the current location of the computer or other information handling device, in the format of latitude and longitude, is obtained from the location information resource 806. The latitude and longitude information are then converted to a geographical place name of the location that corresponds to the latitude and longitude 808. The geographical place name information is then inserted into the signature block 810. The email with the included geographical name information is then sent 812. It is to be understood, that in this context sending an email may mean actually transmitting the email to another computer, or information handling device, directly or through some communication network, or simply spooling the email for subsequent transmission.

Figure 9:
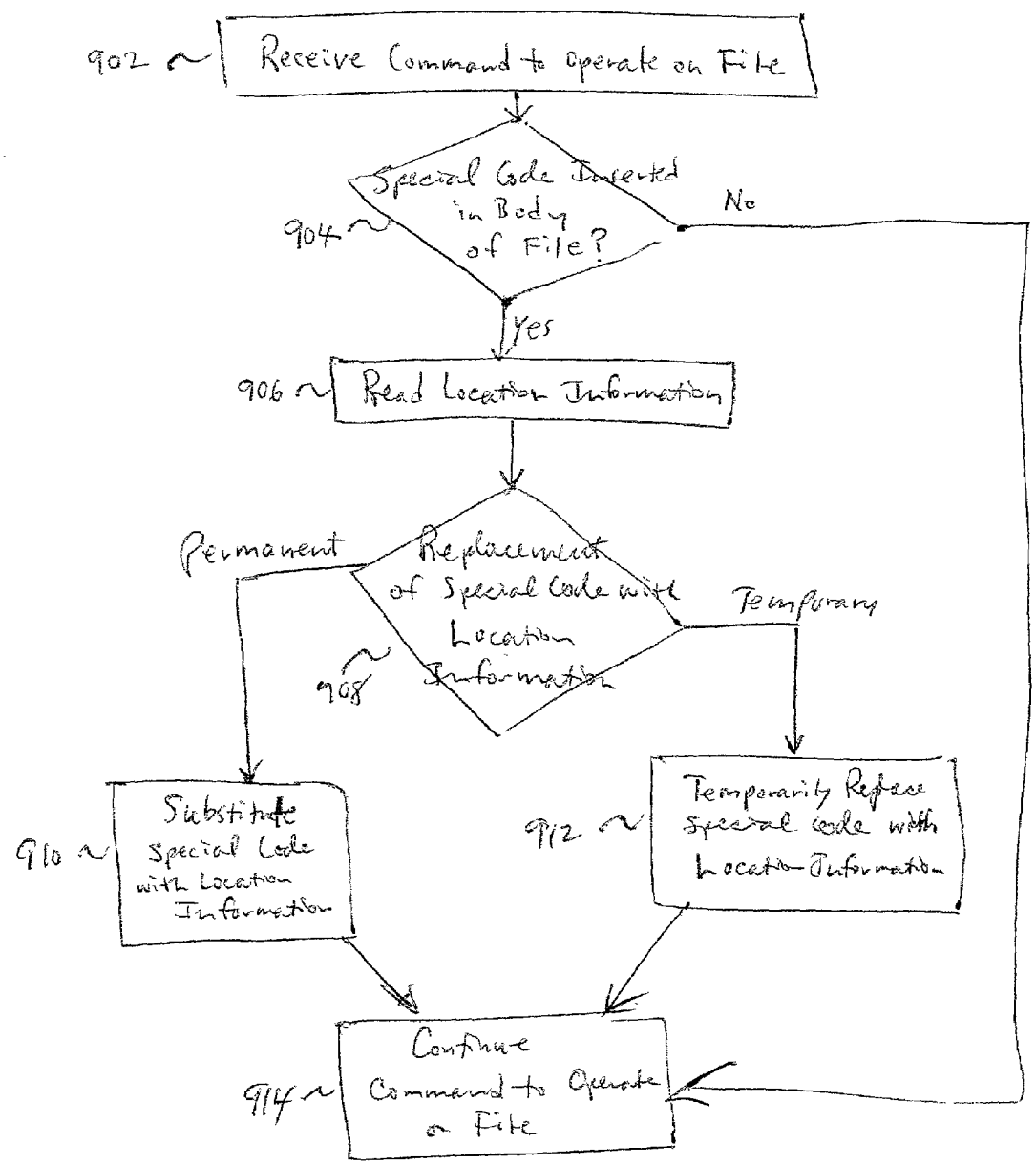
FIG. 9 is a flowchart of an illustrative process in accordance with the present invention that incorporates location information into a file in connection with a special code associated with the file.

FIG. 9 is a flowchart of an illustrative process in accordance with the present invention that incorporates location information into a file in connection with a special code previously inserted into the file or associated with the file. The special code or character or field may be in the file itself or in associated data structures. Moreover, the special code may be inserted into the file or associated with the file by the user or by default. The special code may indicate a permanent substitution of the code with location information or temporary replacement of the code with location information. Herein, the phrase "associated with" is used to describe data structures or another file associated with the file of interest.

Some conventional word processing, spreadsheet, and presentation graphics programs provide users with a feature that automatically replaces a special code inserted in a file with current date or time information. That is, a user inserts a special code in a file, and, when the file is, for example, opened or displayed or modified or printed, the special code is replaced with the current date and time. Some programs provide the user with various options with respect to how the special code is interpreted such as, but not limited to, language format, display of date only, display of time only, formats for date and time information, and so on. Some programs also provide the user with options to control whether the special code is temporarily replaced with date and time information each time the file is, for example, opened or whether the special code is permanently replaced the first time the file is, for example, opened. In this example, a computer system, or other information handling device, having a location information resource (such as location information resource 112 of FIG. 1), and capable of running a word processing, spreadsheet, presentation graphics, or some other type of file editing program, receives a command to operate on a file 902. A decision is then made 904 as to whether the requisite special code is present, e.g., inserted into the body of the file. If the special code is not present or associated with the file, the operation specified by the command then continues 914. If the special code is included in the file, then the current location of the computer, or other information handling device, is obtained from the location information resource 906. At 908, a determination is made whether the special code is to be replaced with the location information permanently or temporarily. If the user selection is for permanent replacement of the special code with the location information, then such location information is substituted 910 for the special code and no subsequent replacements will be made until another special code is inserted in, or associated with, the file. If the user selection is for temporary replacement, then such location information temporarily replaces the special code 912. For example, if a file is opened for viewing and includes a special code in the body of the file indicating a selection for temporary replacement of the special code with location information, then the location information is displayed in lieu of the special code while the file is opened for E viewing. If the file is again opened for viewing, but this time the user is in a new geographic location, as might be the case for a salesperson using a presentation graphics file, the location information is displayed with the current location information reflecting the new geographic location.

In another embodiment, incorporation of location information into a file, also referred to as location stamping the file, is used to identify the point of origin of an annotation to a file. For example, in virtual organizations where people in various geographically dispersed locations work collaboratively via electronic means, several users might be updating the same electronic file, each with annotations. Some embodiments of the present invention provides location information so that the points of origin for such annotations can be readily identified.

Figure 10:
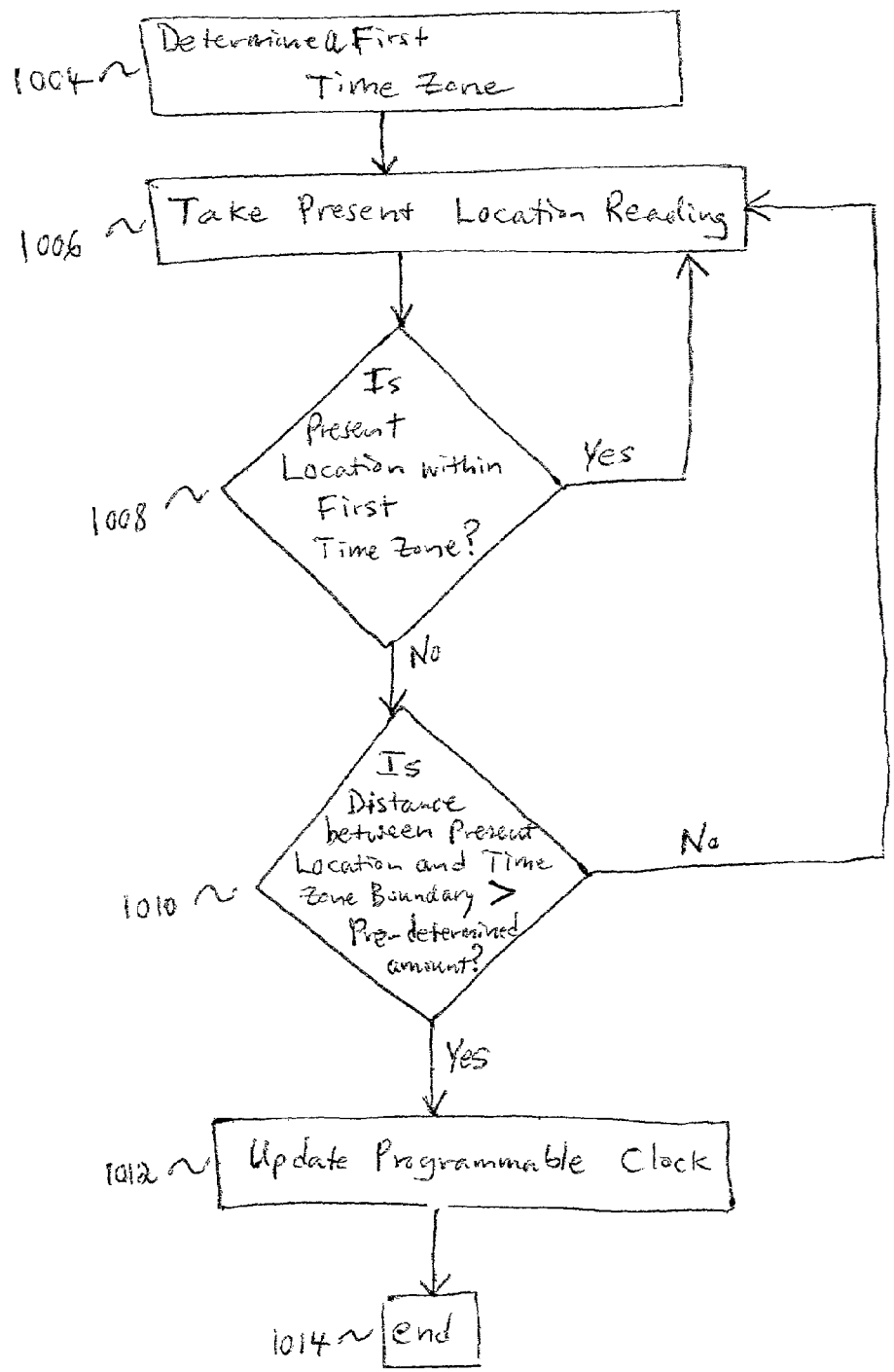
FIG. 10 is a flowchart of an illustrative process in accordance with the present invention that provides time and time zone information to a programmable clock.

FIG. 10 is a flowchart of an illustrative process in accordance with the present invention that provides time and time zone information to a programmable clock, where the time and time zone information is representative of the geographic location of the computer system or information handling device that includes the location information resource. That is, FIG. 10 is a flowchart showing a process for updating a programmable clock with time and time zone information. The programmable clock may be updated automatically as the computer system or information handling device is moved from one geographic location to another. This automatic updating function can be selected by the user. Or, as an alternative or in addition to automatic updating, the user can initiate the updating of the programmable clock to include current time and time zone information. Another option allows the user to view time and time zone information that varies with the location of the computer system or information handling device and, at the same time, also view time information corresponding with a fixed reference time zone.

For example, the user might choose to view both current location-based time and time zone information, as the user might be traveling from location to location, while maintaining a reference point to a "home" time and time zone, such as the time in the Pacific Daylight time zone. The fixed reference time zone is typically expressed as an offset from universal time (UTC) or Greenwich Mean Time (GMT) or Z-time, each of which correspond with the time at zero degrees longitude, i.e. at the prime meridian. For example, Thursday 11:00 PM Pacific Daylight Time (PDT) corresponds with Friday 6:00 AM universal time, an offset of seven hours. If the user is currently in Austin, Tex., where the local time in Austin corresponding with Thursday 11:00 PM Pacific Daylight Time is Friday 1:00 AM Central Daylight Time (CDT), both the fixed reference time, Thursday 11:00 PM PDT, and the current local time, Friday 1:00 AM CDT, are displayed. Here, the "11:00" and "1:00" displays are examples of numeric time information using Arabic numerals, and the "PDT" and "CDT" displays are examples of abbreviated time zone information in the English language. It is to be appreciated that alternative languages and numbering systems can be used in accordance with the present invention. Likewise, alternative formats for the display of time information can also be used in accordance with the present invention. Herein, time information includes both time and time zone information and may also include date information. In the above example, the change in time information corresponding with the change in time zone from PDT to CDT includes a change in the date also. That is, Thursday 11:00 PM PDT corresponds with Friday 1:00 AM CDT. If, for example, time information is updated to from PDT to CDT to reflect updated location information, the updated time information includes the change in date from Thursday to Friday, in addition to the changes in numeric time, AM/PM indicator, and time zone abbreviation.

Many computer systems and other information handling devices provide a programmable clock feature. For example, a programmable clock is included with most computer systems, and the programmable clock typically accepts actions by the user to update or adjust the clock attributes. Such attributes include, but are not limited to, time setting in hours, minutes, seconds, and an "AM" or "PM" indicator; time display format; fixed reference time zone, typically expressed as an offset from universal time (UTC); date setting with month, day, and year; date display format; language setting; and an option for automatic time adjustment for daylight savings time.

In this example, a computer system, or other information handling device, having a location information resource (such as location information resource 112 of FIG. 1), determines a first time zone 1004. The first time zone is either a previously stored time zone, previously stored or updated into the programmable clock, or a predetermined default time zone. The predetermined time zone can be any time zone and, in one embodiment, is selected by the user. Next, the computer system or other information handling device reads present location 1006 using the location information resource. Using the latitude and longitude information obtained from the location information resource, a determination is made whether the present location is within the first time zone 1008. The coordinates of the present location are compared with the corrdinates that define the well-known time zone boundaries. These time zone boundary coordinate sets can be stored in a file or other memory within the exemplary computer system. In one embodiment, a data table within the computer system or information handling device that cross-references latitude and longitude information with time zone information is used. If the present location is within the first time zone, then no action is required other than to continue the process of taking another location reading 1006 and determining whether the location coordinates are within the first time zone 1008. If the present location is not within the first time zone, then a determination is made whether a distance between the present location and the boundary with the first time zone is greater than a predetermined amount 1010. If the distance is less than the pre-determined amount, then the process of taking another location reading 1006 and again determining whether the location coordinates are within the first time zone 1008 is repeated. If the distance is greater than the pre-determined amount, then the programmable clock is updated 1012 to reflect the current time in the new present time zone.

The pre-determined amount is dependent upon the margin of error of the location information resource plus a distance needed for hysteresis. Location information resources such as GPS modules have various margins of error, depending upon the manufacture of the module and situation-specific operating characteristics. For example, a GPS module without the capability to receive a reference or correction signal typically has an accuracy or margin of error of about 100 yards whereas a GPS module with such capability, also known as a Differential GPS, typically has a margin of error of about two to three yards. That is, a Differential GPS is typically capable of providing location information with accuracy to within a couple yards of the actual geographic location.

The distance needed for hysteresis may be arbitrarily chosen and static. Alternatively, the distance needed for hysteresis, in one embodiment, is dynamically calculated such that changes in time zones do not occur within a certain minimum time. Such a calculated distance is needed to prevent the time zone information from oscillating between two values when the location information resource is near a time zone boundary. Hysteresis is helpful to avoid this oscillation. For example, in one embodiment, a default minimum time or hold time between time zone changes is set to five minutes. That is, if time zone information changes, it will not be changed again within the next five minutes. The calculated distance is dependent upon the rate of location change. If the location is changing at a rate of 60 miles per hour or one mile per minute, the distance needed for hysteresis would be five miles. If the location is changing at a rate of six miles per hour, the distance factor would be one-half of one mile.

In one embodiment, the pre-determined amount used in decision 1010 is initially set at a default value, for example, the distance corresponding with a five minute minimum time or hold time between time zone changes plus a distance greater than the margin of error specific to the particular location information resource. In one embodiment, the pre-determined amount is selectable by a user. That is, a user is able to select the pre-determined amount to achieve some desired effect. For example, if the user will be frequently crossing back and forth between two time zones over a short period of time, but wishes to maintain the time zone information that represents one of the two time zones, the user is able to increase the pre-determined amount to a distance great enough to avoid having the time zone information oscillate back and forth between the two time zones.

Figure 11:
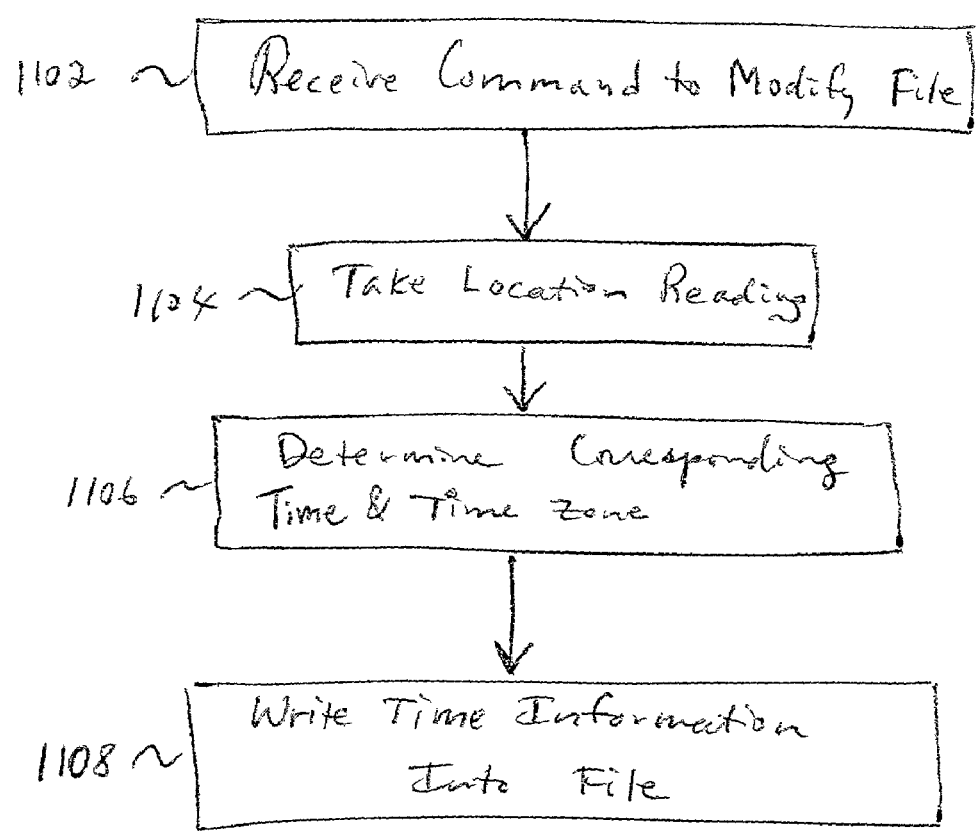
FIG. 11 is a flowchart of an illustrative process in accordance with the present invention that incorporates time and time zone information into a file in connection with a file modify operation.

FIG. 11 is a flowchart of an illustrative process in accordance with the present invention that incorporates time and time zone information into a file in connection with a file modify operation. More particularly, in this embodiment, a command to modify a file is received 1102. However, a wide variety of other commands can be substituted for the "modify" command as shown in FIG. 11. In another embodiment, for example, a command to open a file is received. In yet another embodiment, a command to print a file is received. Location information is read 1104 from a location information resource, such as location information resource 112 of FIG. 1, and latitude and longitude information from the location information resource is used to determine the corresponding time and time zone 1106. Here, the latitude and longitude coordinates from the location information resource are used to determine the corresponding time zone, and the time zone dictates any adjustments to the time information. For example, if the time zone is changed from Mountain to Pacific time, the one hour decrement is reflected in the time information. Once the time and time zone information is determined 1106, it is then written into the file 1108. In one embodiment, the time information is written into the file itself, as part of the historical information associated with the file. In another embodiment, this file history information is maintained by the computer's operating system. The time and time zone information, therefore, becomes part of the file history accessible to other software applications, operating system functions, and so on. For example, once time and time zone information is associated with files in accordance with the process illustrated in FIG. 11, a directory listing utility or software application is able to produce a listing of files including the time and time zone information associated with each file.

In one embodiment, the time and time zone information representative of the current or local geographic position, as read by the location information resource 1104, is associated with the file. That is, the time and time zone information associated with the file corresponds with current location information. In another embodiment, a user selects an option such that a fixed or "home" reference time zone and corresponding time are associated with the file. The fixed reference time zone is universal time (UTC) or a time zone that is an offset from UTC. Examples include Pacific Daylight Time (PDT), Mountain Standard Time (MST), and so on. In yet another embodiment, a user selects an option for time and time zone information reflective of both current location information as well as the fixed reference time zone to be associated with the file. In other words, a user selects whether one or both versions of time and time zone information are to be associated with the file. Alternatively, a user selects an option that uses the time and time zone information available from the computer's system clock or other programmable clock as the information to be associated with the file.

Figure 12:
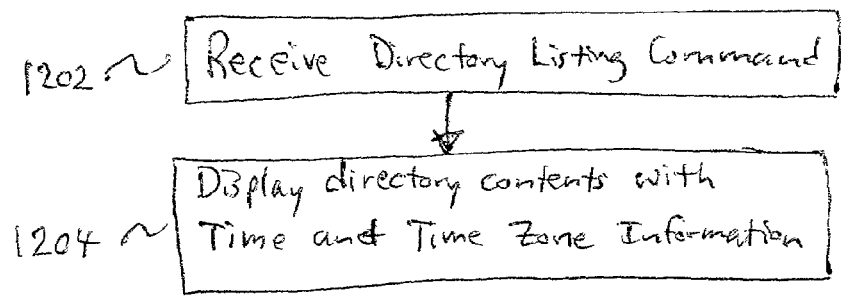
FIG. 12 is a flowchart of an illustrative process to display directory contents with time and time zone information.

FIG. 12 is a flowchart of an illustrative process in accordance with the present invention that provides a directory listing with time and time zone information. Once time and time zone information is associated with files in accordance with the process illustrated in FIG. 11, a directory listing utility is able to provide a listing of files that includes time and time zone information. As illustrated in FIG. 12, a directory listing command is received 1202, and the subsequent display of directory contents 1204 will include time and time zone information.

Figure 13:
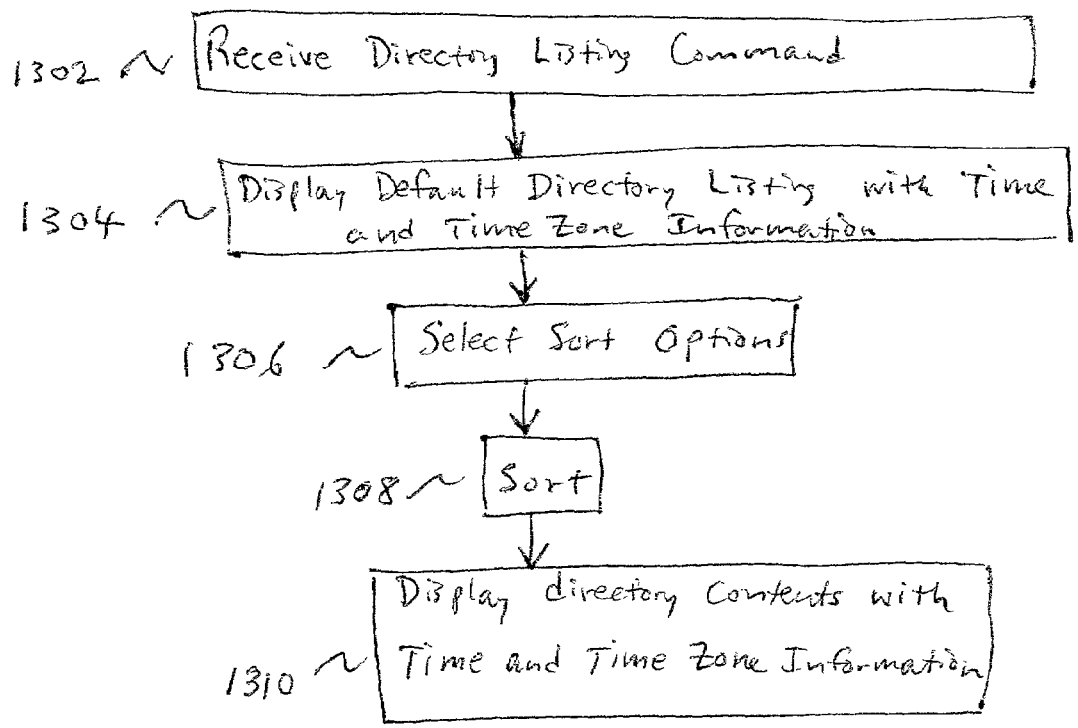
FIG. 13 is a flowchart of an illustrative process to display directory contents with time and time zone information sortable by at least time zone information.

FIG. 13 is a flowchart of an illustrative process in accordance with the present invention that provides a directory listing that may be sorted according to, at least, time and time zone information. A directory listing command is received 1302, and the resulting default directory listing with time and time zone information is displayed 1304. Subsequent to the default display, a user is able to select sorting options 1306 by which the directory listing contents are sorted 1308. Some computer operating systems are equipped with a directory listing utility that allows a user to use simple point and click actions using a mouse or other cursor controlling device to designate a particular sorting option. For example, a user is able to point and click on a portion of the computer screen that includes file size information, thereby causing the display of file contents to be sorted by file size. The present invention provides for the association of time and time zone information with files so that a user is able to choose time and time zone information when selecting sort options 1306. The directory listing contents are sorted 1308 and then displayed with time and time zone information 1310.

FIG. 14 is an illustrative example of a default directory listing that includes time zone and other location information. The files shown are sorted by file name, alphabetically. Line numbers 1-6 are shown for reference only and become more useful when comparing the default listing in FIG. 14 with other examples discussed hereafter. Time zone information is included in the directory listing, in addition to latitude and longitude location information. The date, time, time zone, latitude, and longitude information correspond with the same operation on the named file. For example, the second file is named "B file" 1402 and was last modified Feb. 15, 2001, at 8:45 AM Pacific Standard Time, at latitude N 45:59.009' and longitude W 122:25.064'. In another embodiment, similar date, time, time zone, and location information is displayed in a directory listing and corresponds with a create file operation. In yet another embodiment, time, date, and location information is displayed in a directory listing and corresponds with an open file operation.

FIG. 15 is an illustrative example of a directory listing sorted in an order from most recently modified to least recently modified. That is, the first file shown in FIG. 15 is "C file" 1502 and was last modified Aug. 1, 2001, at 10:00 AM Eastern Daylight Time, at latitude N 45:46.736' and longitude W 84:43.856'. This is more recent than any of the other files shown. Also, because of the time zone information provided by the present invention, files that would otherwise have been ordered differently if sorted by date alone are correctly ordered. For example, line 3 1504 in FIG. 15 shows "D file" as having been more recently modified than line 4 1506, "E file", even though Jun. 28, 2001, is before Jun. 29, 2001. The date information cannot be used without the time zone information to correctly order the files in an order from most recently modified to least recently modified. As with FIG. 14, the information shown in FIG. 15 may represent other file operations such as file last opened, file created, and so forth. Also similar with FIG. 14, the format and organization of the information shown in FIG. 15 may be varied and still be within the spirit of the present invention. For instance, the file size information shown in FIG. 15 may be excluded from the directory listing contents or other file attributes may be added, but the inclusion of location information remains within the spirit of the present invention.

Another example where the benefits of the present invention are particularly useful, is in the situation where two or more people in various geographically dispersed locations work collaboratively via electronic means and are working on the same or similar electronic files. If, for example, lines 3 1504 and 4 1506 in FIG. 15 correspond with the same file, the present invention provides a directory listing that readily reveals that the file in line 3 1504 is the more recent version. That is, "D file" 1504 was last modified Jun. 28, 2001, at 11:00 PM PDT, which is more recent than "E file" 1506, which was last modified Jun. 29, 2001, at 12:30 AM CDT. Without the present invention, determination of the most recently modified file is confusing and prone to error.

Figure 16:
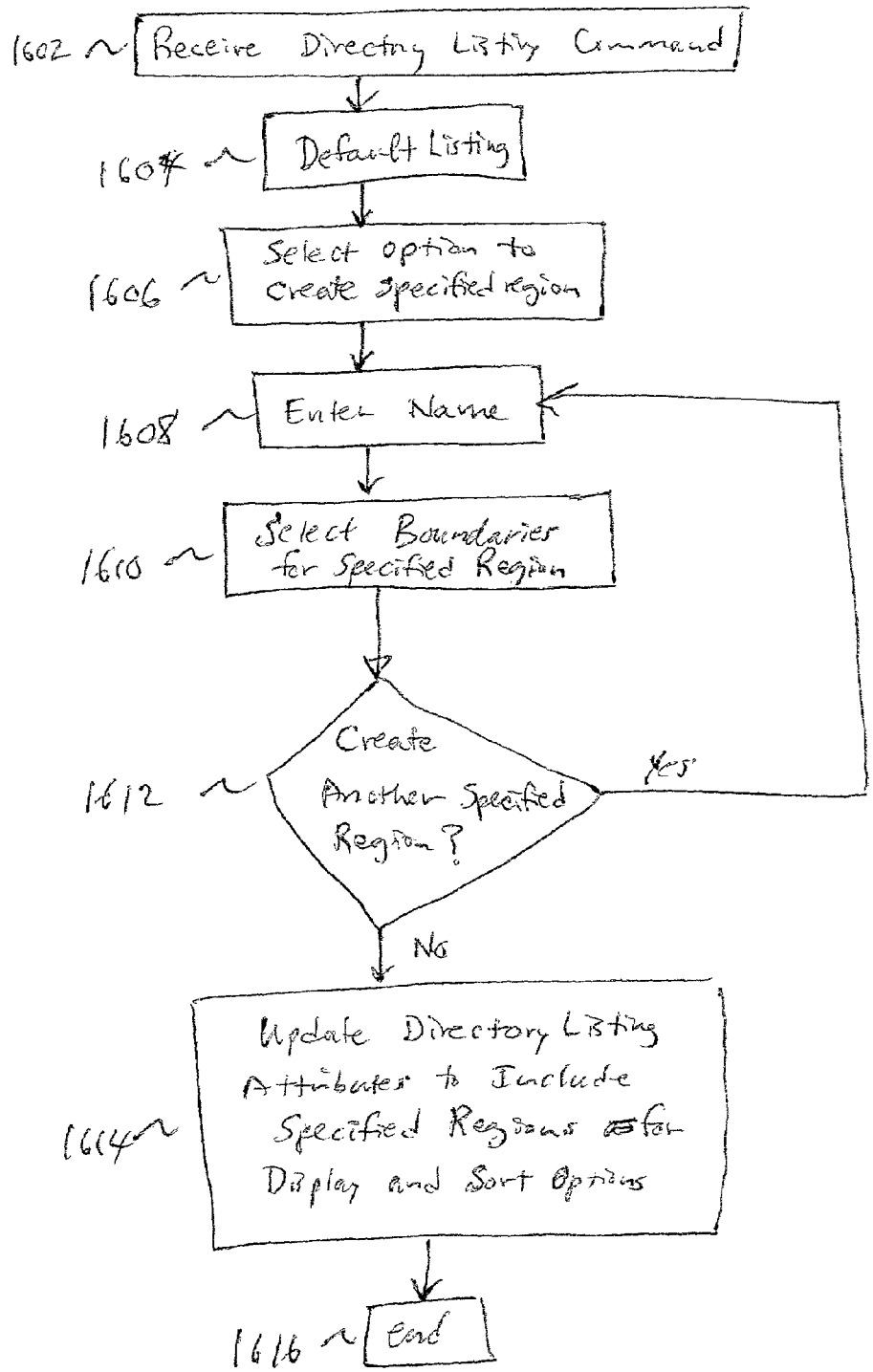
FIG. 16 is a flowchart of an illustrative process in accordance with the present invention that allows for a directory listing to be sorted by user defined specified regions.

FIG. 16 is a flowchart of an illustrative process in accordance with the present invention that allows for a directory listing to be sorted by user defined specified regions. A software application is easily written, by one skilled in the art, to include a simple graphical user interface whereby a user can select an area using a mouse or other cursor controlling device. In one embodiment, such an application is incorporated into a directory listing. That is, the directory listing application includes an option to create specified regions that become file history attributes upon which the directory listing contents can be sorted.

In this example, a directory listing command is received 1602, causing a default directory listing to be displayed 1604. A user then selects an option to create a specified region 1606. For example, a user may point and click on a portion of the window comprising the directory listing display that causes an option menu to open. Upon selecting the option to create specified regions, the user is asked to enter a name for the first specified region 1608. Once a name is entered, the user is presented with a map wherein the user is able to shade or highlight geographic regions that the user wishes to associate with the entered name. The user effectively selects the boundaries for the specified region 1610, the specified region comprising a set of areas defined in terms of latitude and longitude coordinates. If the user wishes to create another specified region 1612, the user is asked to enter another specified region name 1608. If the user is finished creating specified regions, then the directory listing attributes are updated 1614 to include the specified regions for both display purposes as an additional sorting option. That is, the directory listing can be sorted by specified region.

In one embodiment, the directory listing further includes an algorithm that links named specified regions with files having the appropriate latitude and longitude information. That is, a file having latitude and longitude coordinates that fall within the geographic areas assigned to a particular named specified region is associated with that specified region for purposes of directory listing display and sorting. Implementation of an algorithm that effectively cross-references sets of latitude and longitude coordinates and establishes links or associations between files and specified regions is easily accomplished by one skilled in the art. Example directory listing displays incorporating specified regions are provide in FIGS. 17 and 18.

FIG. 17 provides an example display of a directory listing with specified regions information added. The example data used is the same for FIGS. 14, 15, and 17, except for the additional specified regions information 1702. In this example, two sales areas are defined, Sales Area 1 1704 and Sales Area 2 1706.

FIG. 18 provides an example display of directory listing sorted by user defined specified regions. In this example, the files associated with Sales Area 1 1802 are grouped together and further sorted by file name, alphabetically. Similarly, the files associated with Sales Area 2 1804 are grouped together and further sorted by file name, alphabetically.

The present invention may be implemented as circuit-based processes, including possible implementation on a single integrated circuit. As would be apparent to one skilled in the art, various functions of circuit elements may also be implemented as processing operations in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as punched cards, magnetic tape, floppy disks, hard disk drives, CD-ROMs, flash memory cards, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It is to be understood that the present invention is not limited to the embodiments described above, but encompasses any and all embodiments within the scope of the following claims.

What is claimed is:

1. A method of incorporating time and time zone information for a directory listing of computer files, comprising:
   receiving a directory listing command for listing computer files within the directory; and
   displaying a directory listing of computer files, wherein the directory listing of computer files includes time and time zone information associated with each of the computer files;
   selecting a sorting order; sorting the directory listing of computer files in accordance with the sorting order; wherein the directory listing is sorted by specified regions, wherein the specified regions comprise geographic areas defined by longitude and latitude information; and
   displaying the directory listing of computer files in accordance with the sorting order.

2. A method of incorporating time and time zone information for a directory listing of computer files, comprising:
   receiving a directory listing command for listing computer files within the directory; and
   displaying a directory listing of computer files, wherein the directory listing of computer files includes time and time zone information associated with each of the computer files;
   selecting a sorting order; sorting the directory listing of computer files in accordance with the sorting order, wherein the directory listing is sorted by specified regions, wherein the specified regions comprise geographic areas defined by longitude and latitude information; and
   displaying the directory listing of computer files in, accordance with the sorting order.

3. The method of claim 2, wherein the directory listing is sorted by time zone information.

4. A method of incorporating time and time zone information for a directory listing of computer files, comprising:
   receiving a directory listing command for listing computer files within the directory; and
   displaying a directory listing of computer files, wherein the directory listing of computer files includes time and time zone information associated with each of the computer files;
   selecting a sorting order;
   sorting the directory listing of computer files in accordance with the sorting orders, wherein the directory listing is sorted by specified regions, wherein the specified regions comprise geographic areas defined by longitude and latitude information; and
   displaying the directory listing of computer files in, accordance with the sorting order.

5. The method of claim 4, further comprising determining the time zone information based, at least in part, on location information.

* * * * *